3,143,552
REACTION PRODUCTS OF NITRILES AND SULFUR TRIOXIDE
Donald L. Klass, Barrington, and Vincent Brozowski, Mundelein, Ill., assignors to The Pure Oil Company, Chicago, Ill., a corporation of Ohio
No Drawing. Filed Oct. 27, 1961, Ser. No. 148,025
10 Claims. (Cl. 260—327)

This invention relates to a novel composition of matter or reaction product and to the method for preparing the same. More particularly, this invention is directed to a novel reaction product of sulfur trioxide and an aliphatic nitrile, and to its method of preparation.

Hutchings, U.S. Patent 2,908,550, describes the preparation of a novel reaction product of hydrogen cyanide and sulfur trioxide which is produced by dissolving HCN and $SO_3$ separately in an inert, organic solvent and mixing the resulting solutions with agitation at a temperature below 0° C. Hutchings prepared a solid polymeric reaction product having the empirical formula $7HCN \cdot 3SO_3$. The product obtained by Hutchings was a loose complex which could be decomposed to yield HCN and $SO_3$. Eitner, Ber., No. 25, 461–72 (1892), reported that well-cooled benzonitrile could be treated with gaseous sulfur trioxide to yield yellow crystals containing 2 mols of benzonitrile and 1 mol of sulfur trioxide as a complex or addition compound.

One of the objects of this invention is to provide a novel reaction product of sulfur trioxide and saturated aliphatic nitriles.

Another object of this invention is to provide a method for combining sulfur trioxide and saturated aliphatic nitriles.

A feature of this invention is the provision of a novel reaction product of saturated aliphatic nitriles and sulfur trioxide in a 1:1 mol ratio.

A further feature of this invention is the provision of a method for combining a saturated aliphatic nitrile with sulfur trioxide by mixing the materials in a 1:1 mol ratio in an inert solvent.

Other objects and features of this invention will become apparent from time to time throughout the specification and claims as hereinafter related.

This invention is based upon our discovery that saturated aliphatic nitriles react with sulfur trioxide in solution in equimolar quantities to yield reaction products which contain equimolar quantities of nitrile and sulfur trioxide. The structure of these reaction products is not known, but infrared analysis indicates that the nitrile linkage is no longer intact and that a C=N linkage is present. This suggests that the complex may have one of the following structures:

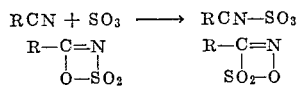

where R is the alkyl radical in the aliphatic nitrile reactant. The compounds of this invention are useful as organic intermediates. These compounds are also useful as insecticides, pharmacologicals, fungicides, etc.

One limitation of this invention is that nitriles with functional groups capable of reacting with sulfur trioxide cannot be used to form the reaction product unless a sufficient excess of sulfur trioxide is used to react with the functional group and with the nitrile group. As a practical matter, the process is essentially limited to alkyl nitriles.

The following non-limiting examples are illustrative of the scope of this invention.

*Example I*

Dioxane, 17.6 g. (0.2 mol), in 75 ml. of ethylene dichloride was treated dropwise at 3° C. with 16.0 g. (0.2 mol) of sulfur trioxide, with cooling and stirring, to yield a slurry of dioxane-sulfur trioxide complex. Stearonitrile, 53.1 g. (0.2 mol), in 100 ml. of ethylene dichloride was then added to the reaction mixture and the temperature was allowed to slowly increase to room temperature. The reaction mixture was stirred for one hour and then kept at room temperature for three days. Evaporation of the solvent under a current of nitrogen gave a semisolid mass which, on recrystallization from dioxane, gave the reaction product as a light tan solid, M.P. 172–173° C.

| Analysis for $C_{18}H_{35}NSO_3$ | Calculated, percent | Found, percent |
|---|---|---|
| Carbon | 62.6 | 62.9 |
| Hydrogen | 10.1 | 10.8 |
| Nitrogen | 4.1 | 4.0 |
| Sulfur | 9.3 | 6.1 |

The infrared analysis of the product showed the presence of the —$SO_2$— group. The nitrile linkage was no longer detectable, indicating that sulfur trioxide had added across the triple bond.

*Example II*

Sulfur trioxide is slowly added, with stirring, to 75 ml. of ethylene dichloride at 0° C., to yield a solution of sulfur trioxide (0.2 mol). Stearonitrile (0.2 mol) in 100 ml. of ethylene dichloride is then added to the reaction mixture and the temperature is allowed to increase slowly to room temperature. The reaction mixture is stirred slowly for 1 hour and kept at room temperature for 3 days. Evaporation of the solvent under a current of nitrogen gives a solid product which on recrystallization of dioxane gives a tan solid corresponding to the product obtained in Example I.

*Example III*

Dioxane, 17.6 g. (0.2 mol), in 75 ml. of ethylene dichloride is treated dropwise, at 3° C., with 16.0 g. (0.2 mol) of sulfur trioxide, with cooling and stirring, to yield a slurry of dioxane-sulfur trioxide complex. Palmitonitrile, 47.4 g. (0.2 mol), in 100 ml. of ethylene dichloride is then added to the reaction mixture and the temperature is allowed to increase slowly to room temperature. The reaction mixture is stirred for 1 hour and then kept at room temperature for 3 days. Evaporation of the solvent under a current of nitrogen gives a solid reaction product containing palmitonitrile and sulfur trioxide in a 1:1 mol ratio.

*Example IV*

Dioxane, 17.6 g. (0.2 mol), in 75 ml. of ethylene dichloride is treated dropwise at 3° C. with 16.0 g. (0.2 mol) of sulfur trioxide, with cooling and stirring, to yield a slurry of dioxane-sulfur-trioxide complex. Capronitrile, 19.4 g. (0.2 mol), in 100 ml. of ethylene dichloride is then added to the reaction mixture, and the temperature is allowed to increase slowly to room temperature. The reaction mixture is stirred for 1 hour and then kept at room temperature for 3 days. Evaporation of the solvent under a current of nitrogen gives a solid product containing capronitrile and sulfur trioxide in a 1:1 mol ratio.

*Example V*

Dioxane, 17.6 g. (0.2 mol), in 75 ml. of ethylene dichloride is treated dropwise at 3° C. with 16.0 g. (0.2 mol) of sulfur trioxide (with cooling and stirring) to yield a slurry of dioxane-sulfur-trioxide complex. Lauronitrile, 36.2 g. (0.2 mol), in 100 ml. of ethylene dichloride is then added to the reaction mixture and the temperature is allowed to increase slowly to room temperature. The reaction mixture is stirred for 1 hour and then kept at room temperature for 3 days. Evaporation of the solvent under a current of nitrogen gives a solid product containing lauronitrile and sulfur trioxide in a 1:1 mol ratio.

In carrying out this process, any aliphatic nitrile can be used as a reactant, although $C_1$–$C_{30}$ alkyl-nitriles are preferred. The reaction can be carried out in any inert solvent (which does not react with nitriles or sulfur trioxide), although preferred solvents are ethylene dichloride, ethylene trichloride, mixed saturated halocarbons, and liquid nitriles themselves.

The reaction is preferably carried out with cooling, although it can be carried out at temperatures ranging from 25° to 150° C. While it is possible to carry out the reaction using sulfur trioxide alone, it is preferred to use a sulfur trioxide complex. The sulfur trioxide-dioxane complex is preferred as the sulfur trioxide treating reagent but other complexes can be used such as dioxane-bis sulfur trioxide, thioxane-sulfur trioxide, dimethyl formamide-sulfur trioxide, etc.

While we have described our invention fully and completely with special emphasis upon several preferred embodiments, we wish it to be understood that within the scope of the appended claims this invention may be practiced otherwise than as specifically described herein.

The embodiments of the invention in which an exclusive property or privilege is claimed are defined as follows:

1. A solid crystalline reaction product produced by adding an alkyl nitrile to a sulfur trioxide- dioxane complex in an inert solvent at about 0°–3° C. to form a reaction mixture, using a 1:1 mol ratio of the alkyl nitrile and sulfur trioxide, allowing the reaction mixture to increase to room temperature, keeping said reaction mixture at room temperature for a period of time sufficient to produce a reaction product containing the alkyl nitrile and sulfur trioxide in a 1:1 mol ratio and characterized by an infrared spectrum indicating the presence of a —$SO_2$— group and a C=N linkage, and recovering the reaction product from the solvent.

2. A reaction product in accordance with claim 1 in which the nitrile is of the formula RCN where R is a $C_1$–$C_{30}$ alkyl radical.

3. A solid crystalline reaction product produced by adding an alkyl nitrile of the formula RCN to a sulfur trioxide-dioxane complex in an inert solvent at about 0°–3°C. to form a reaction mixture, using a 1:1 mol ratio of the alkyl nitrile and sulfur trioxide, allowing said reaction mixture to slowly increase to room temperature, keeping said reaction mixture at room temperature for a period of time sufficient to produce a reaction product of the empirical formula RCN·$SO_3$ characterized by an infrared spectrum indicating the presence of a —$SO_2$— group and a C=N linkage, where in said formulas R is a $C_1$–$C_{30}$ nitrile, and recovering the reaction product by evaporation of the solvent.

4. A reaction product of the empirical formula $$C_{17}H_{35}CN \cdot SO_3$$

produced by adding stearonitrile to a sulfur trioxide-dioxane complex in an inert solvent at about 3° C. to form a reaction mixture, using a 1:1 mol ratio of the stearonitrile and sulfur trioxide, allowing said reaction mixture to slowly increase to room temperature, keeping said reaction mixture at room temperature for a period of time sufficient to produce said reaction product characterized by a melting point of 172–173° C. and an infrared spectrum indicating addition of $SO_3$ across a C=N linkage, and recovering said reaction product by evaporation of the inert solvent.

5. A method of preparing a reaction product of an alkyl nitrile and sulfur trioxide which comprises adding an alkyl nitrile to a sulfur trioxide-dioxane complex in an inert solvent at about 0°–3° C. to form a reaction mixture, using a 1:1 mol ratio of the alkyl nitrile and sulfur trioxide, allowing the reaction mixture to increase to room temperature, keeping said reaction mixture at room temperature for a period of time sufficient to produce a reaction product containing the alkyl nitrile and sulfur trioxide in a 1:1 mol ratio and characterized by an infrared spectrum indicating the presence of a —$SO_2$— group and a C=N linkage, and recovering the reaction product from the solvent.

6. A method in accordance with claim 5 in which the reaction product is recovered by evaporation of the solvent and purified by recrystallization.

7. A method in accordance with claim 5 in which the nitrile is a $C_1$–$C_{30}$ alkyl nitrile.

8. A method in accordance with claim 7 in which the nitrile is stearonitrile.

9. A method in accordance with claim 5 in which the inert solvent is ethylene dichloride.

10. A method of preparing a reaction product of an alkyl nitrile and sulfur trioxide which comprises adding an alkyl nitrile of the formula RCN to a sulfur trioxide-dioxane complex in an inert solvent at about 0°–3° C. to form a reaction mixture, using a 1:1 mol ratio of the alkyl nitrile and sulfur trioxide, allowing said reaction mixture to slowly increase to room temperature, keeping said reaction mixture at room temperature for a period of time sufficient to produce a reaction product of the empirical formula RCN·$SO_3$ characterized by an infrared spectrum indicatnig the presence of a —$SO_2$— group and a C=N linkage, where in said formulas R is a $C_1$–$C_{30}$ nitrile, and recovering the reaction product by evaporation of the solvent.

References Cited in the file of this patent

FOREIGN PATENTS 741,770    Great Britain _____ Dec. 14, 1955

OTHER REFERENCES

Gilbert, Chemical Reviews, 62, 588 (1962).

Migrdichian, "The Chemistry of Organic Cyanogen Compounds," page 61 (1947), ACS Monograph No. 105, Reinhold Publishing Co., New York.